Figure 1:
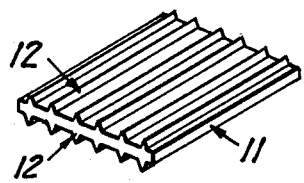

Dec. 22, 1964 D. M. BARTOS 3,162,722
ELECTRIC TAPE INSULATION AND ITS APPLICATION TO CONDUCTOR
Filed March 4, 1964

INVENTOR.
DONALD M. BARTOS
BY
Richard M. Howell
ATTORNEY

3,162,722
**ELECTRIC TAPE INSULATION AND ITS
APPLICATION TO CONDUCTOR**
Donald M. Bartos, Midland, Mich., assignor to Dow
 Corning Corporation, Midland, Mich., a corporation
 of Michigan
Filed Mar. 4, 1964, Ser. No. 354,494
10 Claims. (Cl. 174—110)

This application is a continuation-in-part of application Serial Number 121,223 and application Serial Number 121,224, now abandoned, both filed June 30, 1961.

This invention relates to new electric insulation components and a method for employing these components together to give improved insulation. The components consist of certain rough silicone rubber tapes and certain filled silicone-based pastes.

The use of silicone rubber as electric insulation has been increasing steadily. Such insulation makes possible, first, an increase in motor power without any increase in motor size, and second, trouble-free operation under adverse conditions such as high humidity, high temperature and the like. One type of such insulation is based on the use of silicone rubber tapes. The tape systems have been broken down into two categories. The first and oldest tape system employs a cured tack-free tape used in conjunction with a vulcanizable paste. The second and much newer tape system employs a tacky tape, preferably cured, which adheres to itself and consequently requires no paste. Both tape systems have been commercially successful in low voltage electrical applications. However, neither system has been sufficient to satisfy the demands of high voltage machines.

The manufacturers of electric machines produce, in addition to the common low-voltage machines, machines designed to operate at from 6 kv. to 25 kv. Adequate insulation for such machines has been difficult to find and difficult to apply being based principally on resin systems. The problem is that the insulation on these high voltage machines must be consistently good since these high voltage machines are very expensive, are expected to last for at least 20 years generally and once installed are extremely difficult either to repair or replace. In view of the labor savings in using silicone rubber tape systems for insulation there has been a great deal of effort expended in trying to adapt such systems to high voltage machines. However, with previously known tape systems the insulation has not had consistently a minimum dielectric strength over about 170 volts per mil of insulation thickness even though individual samples of insulation having strengths over 200 volts per mil have been found.

The primary object of this invention is to provide an electric conductor containing a silicone rubber tape electric insulating system capable of consistently withstanding at least 225 volts per mil and preferably more than 285 volts per mil of insulation thickness. Another object is to provide modifications in previously known silicone rubber tape systems which increase their dielectric strength such that the average dielectric strength is in the area of at least 310 volts per mil of insulation thickness. Another object is to provide a method for adequately insulating a conductor or an electric machine capable of operating at up to 25 kv.

This invention relates to an insulated electric conductor comprising a conductor, a cured tack-free silicone rubber tape at least one surface of which is rough, said rough surface facing the conductor, said tape being tension wrapped with lapping around the conductor, the interstices between the laps of tape and between the tape and the conductor being filled with a cured diorganopolysiloxane containing a metallic oxide filler, whereby the dielectric strength of the resulting void-free insulation is at least 225 volts per mil of insulation thickness.

This invention also relates to an insulated electric conductor comprising a conductor, a cured tack-free silicone rubber tape at least one surface of which is rough, said rough surface facing the conductor, said tape being tension wrapped with lapping around the conductor, the interstices between the laps of tape and between the tape and conductor being filled with a cured paste composition which consisted essentially of a diorganopolysiloxane having a viscosity at 25° C. of from about 10,000 cs. to about 10,000,000 cs. and about 0.1 to about 1.0 percent of the siloxane units in said diorganopolysiloxane having at least one vinyl radical attached thereto, whereby the dielectric strength of the resulting void-free insulation is at least 225 volts per mil of insulation thickness.

This invention further relates to a method of preparing electric insulation capable of withstanding a difference in electric potential of at least 225 volts per mil of insulation thickness comprising (1) wrapping under tension with lapping around an electric conductor a cured tack-free silicone rubber tape at least one surface of which is rough, said rough surface facing the conductor, the interstices between the tape laps and between the tape and the electric conductor being filled with a paste, preferably having a viscosity at 25° C. of from about 10,000 cs. to about 10,000,000 cs., consisting essentially of a mixture of a diorganopolysiloxane having a viscosity at 25° C. of from about 2000 cs. to about 500,000 cs. and a metallic oxide filler, and (2) vulcanizing the diorganopolysiloxane.

This invention relates to a method of preparing electric insulation capable of withstanding a difference in electric potential of at least 225 volts per mil of insulation thickness comprising (1) wrapping under tension with lapping around an electric conductor a cured tack-free silicone rubber tape at least one surface of which is rough, said rough surface facing the conductor, the interstices between the tape laps and between the tape and the electric conductor being filled with a paste composition consisting essentially of a diorganopolysiloxane having a viscosity at 25°C. of from about 10,000 cs. to about 10,000,000 cs., from about 0.1 to about 1.0 percent of the siloxane units in said diorganopolysiloxane having at least one vinyl radical attached thereto, and (2) vulcanizing the diorganopolysiloxane.

The materials employed in combination for electric insulation in this invention include a silicone rubber tape and a paste. The silicone rubber tape can be any commerically-available cured tack-free silicone rubber in tape form. The rubber employed in such tapes is based generally on diorganopolysiloxane gums having Williams plasticities from about 0.045 inch to over 0.100 inch. The silicon-bonded organic radicals can be any monovalent hydrocarbon radicals, halogenated monovalent hydrocarbon radicals and cyanoalkyl radicals. Generally, these organic radicals have been limited to the methyl, phenyl, vinyl, 3,3,3-trifluoropropyl and gamma-cyanopropyl radicals with at least 50 percent of the radicals being methyl radicals. Where the organic radicals are monovalent hydrocarbon radicals, over 90 percent of them are usually methyl radicals.

For each 100 parts by weight of gum there is generally added from about 20 to 80 parts by weight of reinforcing silica fillers or from about 20 to 400 parts by weight of non-reinforcing fillers. Less than 20 parts of filler can be added, but its effect will be very small. Typical fillers include, for example, fume silica, silica aerogel, precipitated silicas, ferric oxide, titanium dioxide, zinc oxide and calcium carbonate. The silica-filled tapes are preferred.

The silicone rubber tape stocks can be cured by irradiation. However, they are more commonly cured by including from about 0.1 to 10 parts by weight per 100 parts of diorganopolysiloxane of an organic peroxide such as benzoyl peroxide, tertiary-butylperbenzoate, tertiary-butyl peroxide, dichlorobenzoyl peroxide and 2,5-dimethyl-2,5-bis(t-butylperoxy)hexane, heating the resulting stock to activate the peroxide and maintaining the heat until the stock is cured. Additives are generally included, for example, to improve heat stability in the ultimate rubber, reduce or eliminate crepe hardening in the stock, give flame resistance to the rubber, pigment the rubber, improve milliability of the stock and the like.

In order to achieve the special insulating benefits derived from the method of this invention at least one and preferably both broad surfaces of the silicone rubber tape should be rough. The term "rough" in this case describes a tape surface having either projections or depressions.

Figure 2:
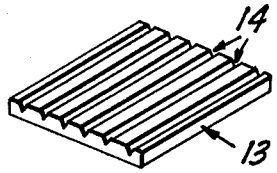
Figure 3:
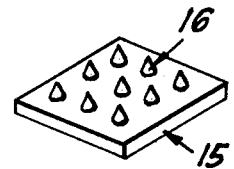
Figure 4:
Figure 5:
Figure 6:

FIGURES 1, 2 and 3 are isometric views of pieces of tape having rough surfaces. FIGURE 1 shows a typical tape 11 having projections 12 on both broad tape surfaces. Such projections can be on one surface only if desired. FIGURE 2 shows a typical tape 13 having depressions 14 in one surface. Such depressions can be in both broad surfaces. FIGURE 3 shows a tape 15 having conical projections 16 from one surface. FIGURES 4, 5 and 6 are sections of other operative tapes. FIGURE 4 shows a section of a tape 17 in which both broad surfaces are rough within the meaning of the term "rough" in this application. FIGURES 5 and 6 show respectively an elliptical or lens-shaped tape 18 and a triangular tape 19 each having projections from one surface. The irregularities, i.e., the projections or depressions, causing a tape surface to be rough can be uniformly spaced or randomly spaced. By far the best results are obtained where there are at least about eight irregularities per inch of width or length of tape and that such irregularities reach no more than about 10 mils from the surface on or in which they appear. These irregularities are best incorporated in the tape by modification of the tape extrusion die, but they can be incorporated after the tape is extruded if desired.

The paste employed in the method of this invention is based generally on diorganopolysiloxanes having viscosities at 25° C. in the range of from about 2000 cs. to about 500,000 cs. or in the range of from about 10,000 cs. to about 10,000,000 cs. depending on the paste system employed. The viscosities are not critical as far as electrical properties of the cured systems are concerned.

The organic radicals attached to silicon in the diorganopolysiloxanes employed in the pastes can be monovalent hydrocarbon radicals or halogenoaromatic monovalent hydrocarbon radicals or fluoroaliphatic monovalent hydrocarbon radicals in which each fluorine atom is separated from any silicon atom by at least three carbon atoms. More specifically each of these organic radicals can be for example, any alkyl radical such as the methyl, ethyl, isopropyl, tert-butyl, 2-ethylhexyl, dodecyl, octadecyl and myricyl radicals; any alkenyl radical such as the vinyl, allyl, decenyl and hexadienyl radicals; any cycloalkyl radical such as the cyclopentyl and cyclohexyl radicals; any cycloalkenyl radical such as the cyclopentenyl, cyclohexenyl and cyclo-2,4-hexadienyl radicals; any aryl radical such as the phenyl, naphthyl and xenyl radicals; any aralkyl radical such as the benzyl, phenylethyl and xylyl radical and any alkaryl radical such as the tolyl and dimethylphenyl radicals. Each of these organic radicals can also be, for example, 3,3,3-trifluoropropyl, 3,3,4,4,5,5,5-heptafluoropentyl, perchlorophenyl, 2,4-dibromobenzyl, and $\alpha,\alpha,\alpha$-trifluorotolyl radicals. Preferably, at least 50 percent of the organic radicals are methyl radicals and any others are phenyl, vinyl or 3,3,3-trifluoropropyl radicals.

Preferably from about 0.1 to about 1.0 percent of the silicon atoms in the diorganopolysiloxane in the paste have at least one vinyl group attached thereto. These vinyl-containing siloxane units can be terminal units such as the dimethylvinylsiloxane and phenylmethylvinylsiloxane units or units along the siloxane chain such as methylvinylsiloxane, phenylvinylsiloxane and divinylsiloxane units. When no metallic oxide filler is present in the paste, the presence of the vinyl groups in the above specified concentration is essential in order to achieve the objects of this invention.

For each 100 parts by weight of diorganopolysiloxane in the paste utilized in the one facet of this invention there is generally from about 20 to 400 parts, preferably from about 50 to about 200 parts, of a metallic oxide filler wherein the term "filler" defines an inert substance added to increase the viscosity of a plastic material, i.e. the diorganopolysiloxane. Less than 20 parts of filler can be added, but its effect will be very small. The metallic oxide filler can be an oxide of any metal from aluminum to bismuth in the periodic table of elements with the exception of the alkali metals and alkaline earth metals, the oxides of both of which are reactive in the system, i.e. not inert substances and therefore not fillers. More specifically, the metal oxides can be, for example, the oxides of aluminum, silicon, scandium, titanium, vanadium, chromium, manganese, iron, cobalt, nickel, copper, zinc, gallium, germanium, yttrium, zirconium, niobium, molybdenum, technetium, ruthenium, rhodium, palladium, silver, cadmium, indium, tin, antimony, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead and bismuth. The preferred fillers are titanium dioxide, zinc oxide and ferric oxide used separately or together or in conjunction with any of the other fillers.

The paste formed by the combination of diorganopolysiloxane and metal oxide filler should have a viscosity at 25° C. of from about 10,000 cs. to about 10,000,000 cs. in order to have flow characteristics which facilitate the preparation of void-free insulation.

Any of the paste systems are easily curable by irradiation. However, the paste preferably contains some curing accelerator. Generally, from about 0.1 to 10 parts by weight per 100 parts of diorganopolysiloxane of an organic peroxide is included such as, for example, benzoyl peroxide, tertiary-butyl-perbenzoate, tertiary-butyl-peroxide, dichlorobenzoyl peroxide and 2,5-dimethyl-2,5-bis(t-butylperoxy)hexane. Benzoyl peroxide and 2,5-dimethyl-2,5-bis(t-butylperoxy)hexane are preferred. Peroxide catalyzed pastes can be heat cured according to standard techniques.

Figure 7:
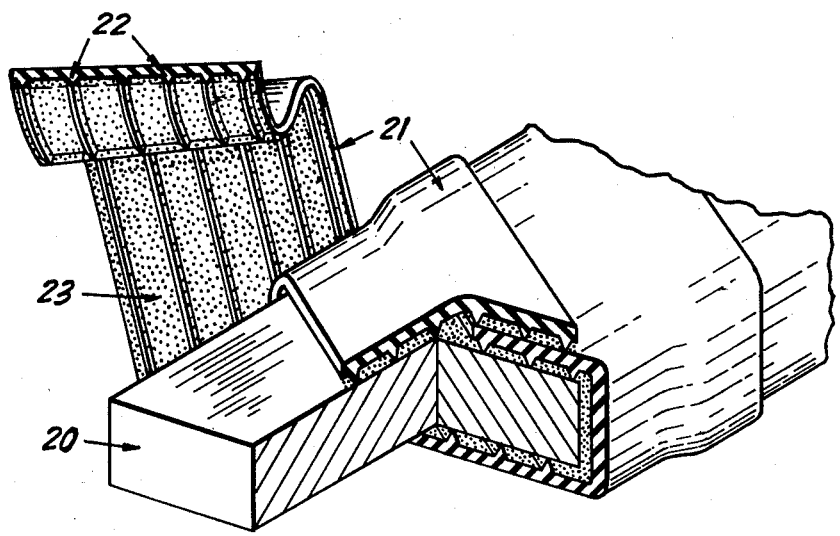
Figure 8:

The tape and paste combination can be applied using any of a variety of techniques. The paste can be applied to one surface, preferably the rough surface, of the tape such that when the tape is applied to the conductor the rough surface of the tape is adhered to the conductor and to other tape laps by the paste. This is illustrated in FIGURE 7, a section of an isometric view of a conductor 20 being wrapped with lapping with a silicone rubber tape 21 having longitudinal ridges 22 on one surface which is coated with a paste 23 in accordance with the method of this invention. The preferred method, however, is to apply the paste evenly to both sides of the tape and simply wrap the paste covered tape around a conductor with whatever lapping is desired. FIGURE 8 is a section of a tape 24 coated on both sides with paste 23. One layer of lapped tape may be adequate. However, the tape and paste can be lapped by using multiple layers with no difficulty.

The following examples illustrate the various types of pastes which have been tested. The preferred method for preparing these pastes when they contained a metallic oxide filler included mixing the diorganopolysiloxane and filler for from 3 to 5 hours at from 150° to 180° C. at 20 inches of Hg absolute pressure, cooling the resultant mixture and then mixing in the peroxide at room temperature. All viscosities are measured at 25° C. All quantities are in parts by weight. All these pastes were in the viscosity range of from 10,000 cs. to 10,000,000 cs. at 25° C.

*Paste I*

100 parts of a 15,000 cs. copolymer of 92.5 mol percent dimethylsiloxane units and 7.5 mol percent phenylmethylsiloxane units, 100 parts of $TiO_2$ and 5 parts of benzoyl peroxide.

*Paste II*

Similar to Paste I with 100 parts of ferric oxide in place of the $TiO_2$.

*Paste III*

100 parts of a 15,000 cs. copolymer of 99.184 mol percent dimethylsiloxane units, 0.569 mol percent methylvinylsiloxane units and 0.247 mol percent dimethylvinylsiloxane units, 91 parts of $TiO_2$, and 2 parts of dichlorobenzoyl peroxide.

*Paste IV*

100 parts of a 6000 cs. isopropoxy-endblocked copolymer of 0.193 mol percent methylvinylsiloxane units and 99.807 mol percent dimethylsiloxane units, 91 parts of $TiO_2$ and 1.3 parts of benzoyl peroxide.

*Paste V*

100 parts of the copolymer of Paste III, 1.0 part of fume silica and 1.3 parts of benzoyl peroxide.

*Paste VI*

100 parts of a 10,000 cs. vinyldimethylsiloxy-endblocked dimethylpolysiloxane (0.25 mol percent vinyldimethylsiloxane units), 91 parts of $TiO_2$ and 1.3 parts of benzoyl peroxide.

*Paste VII*

100 parts of the copolymer of Paste III, 91 parts of zinc oxide and 1.3 parts of benzoyl peroxide.

*Paste VIII*

100 parts of the copolymer of Paste III, 91 parts of iron oxide and 1.3 parts of benzoyl peroxide.

*Paste IX*

100 parts of a 10,000 cs. vinyldimethylsiloxy-endblocked dimethylpolysiloxane, 91 parts of zinc oxide and 1.3 parts of benzoyl peroxide.

*Paste X*

100 parts of a 13,000 cs. isopropoxy-endblocked copolymer of 99.807 mol percent dimethylsiloxane units and 0.193 mol percent methylvinylsiloxane units, 91 parts of zinc oxide and 1.3 parts of benzoyl peroxide.

*Paste XI*

100 parts of the copolymer of Paste III, 91 parts of $TiO_2$ and 1.3 parts of benzoyl peroxide.

Test samples were prepared by smearing these pastes on both sides of silica-filled 20 mil thick silicone rubber tapes some having about 30 longitudinal ribs from 1 to 10 mils high per inch of tape width extruded on both sides and some having an average of at least 12 random depressions of from 1 to 10 mils deep per inch of width on both sides caused by sanding the tape surfaces. Each of the pasty tapes was then wrapped under tension around a series of conductors with half-lapping to a thickness of from about 0.125 inch to about 0.200 inch, the tape and paste was vulcanized for one hour at 175° C. and cured for 8 hours at 150° C. and 8 hours at 200° C. Subsequently, the insulated conductors were tested with a General Electric Dielectric Strength Test Set having an operating range of 0 to 75 kilovolts. The test involved wrapping each insulated conductor with aluminum foil two inches wide, connecting leads to the foil and the conductor and applying an electric potential across the leads. The potential in this test increased at a rate of 2000 volts per minute step by step.

Pastes I, II and III provided insulation systems having dielectric strengths greater than 225 volts per mil of insulation thickness. Pastes IV, V, VI and VII provided insulation systems having dielectric strengths greater than 260 volts per mil. Pastes VIII and IX provided insulation systems having dielectric strengths greater than 285 volts per mil. Pastes X and XI provided insulation systems having dielectric strengths greater than 325 volts per mil.

Similar results are obtained when any of the following metallic oxide fillers are substituted for the iron oxide in Paste VIII: $Mn_2O_3$, $GeO_2$, $ZrO_2$, $MoO_3$, $RhO_2$, $AgO$, $Sb_2O_3$, $CeO_2$, $Yb_2O_3$, $Ta_2O_5$, $PtO_2$, $PbO$ and $Bi_2O_2$.

Similar results are obtained when 2,5-dimethyl-2,5-bis (t-butylperoxy)hexane is substituted for the benzoyl peroxide in Paste XI.

Similar results are obtained when the following 10,000 cs. polysiloxane are substituted for the polymer in Paste IX.

(A) A vinyldimethylsiloxy-endblocked 3,3,3-trifluoropropylmethylpolysiloxane.
(B) A phenylmethylvinylsiloxy-endblocked copolymer of 10 mol percent dichlorophenylmethylsiloxane units and 90 mol percent dimethylsiloxane units.
(C) A vinyldimethylsiloxy-endblocked copolymer of 5 mol percent $\alpha,\alpha,\alpha$-trifluorotolylmethylsiloxane units and 95 mol percent dimethylsiloxane units.

Similar results are obtained when a mixture of 100 parts of a 300,000 cs. copolymer of 0.25 mol percent methylvinylsiloxane units and 99.75 mol percent dimethylsiloxane units, 40 parts of $TiO_2$ and 1.3 parts of benzoyl peroxide is substituted for Paste IV above.

Typical vinyl containing pastes containing no metallic oxide filler which can be employed include, for example:

*Paste XII*

100 parts of a 15,000 cs. copolymer of 99.184 mol percent dimethylsiloxane units, 0.569 mol percent methylvinylsiloxane units and 0.247 mol percent dimethylvinylsiloxane units and 1.3 parts of benzoyl peroxide.

*Paste XIII*

100 parts of a 20,000 cs. vinyldimethylsiloxy endblocked dimethylpolysiloxane (about 0.2 mol percent vinyldimethylsiloxane units) and 2 parts of 2,5-dimethyl-2,5-bis(t-butylperoxy) hexane.

*Paste XIV*

100 parts of a 13,000 cs. isopropoxy-endblocked copolymer of 99.807 mol percent dimethylsiloxane units and 0.193 mol percent methylvinylsiloxane units and 1.3 parts of benzoyl peroxide.

*PASTE XV*

100 parts of a 20,000 cs. copolymer of 3,3,3-trifluoropropylmethylsiloxane units and vinyldimethylsiloxane units and 5 parts of benzoyl peroxide.

*Paste XVI*

100 parts of 50,000 cs. phenylmethylvinylsiloxy-endblocked copolymer of 10 mol percent dichlorophenylmethylsiloxane units, 0.3 mol percent methylvinylsiloxane units and 89.7 mol percent dimethylsiloxane units and 1.3 parts of benzoyl peroxide.

*Paste XVII*

100 parts of 30,000 cs. copolymer of 5 mol percent $\alpha,\alpha,\alpha$-trifluorotolylmethylsiloxane units, 0.7 mol percent methylvinylsiloxane units and 94.3 mol percent dimethylsiloxane units and 1.3 parts of benzoyl peroxide.

Paste XVIII 100 parts of a 2,000,000 cs. copolymer of 0.25 mol percent methylvinylsiloxane units and 99.75 mol percent dimethylsiloxane units and 1.3 parts of benzoyl peroxide.

Test samples were prepared by smearing Paste XII on both sides of a silica-filled 20 mil thick silicone rubber tape having about 30 longitudinal ribs from 1 to 10 mils high per inch of tape width extruded on both sides. The pasty tape was then wrapped under tension around a series of conductors with half-lapping to a thickness of from about 0.125 inch to about 0.200 inch, the tape and paste was vulcanized for one hour at 175° C. and cured for 8 hours at 150° C. and 8 hours at 200° C. Subsesequently, the insulated conductors were tested with a General Electrical Dielectric Strength Test Set having an operating range of 0 to 75 kilovolts. The test involved wrapping each insulated conductor with aluminum foil two inches wide, connecting leads to the foil and the conductor and applying an electric potential across the leads. The potential in this test increased at a rate of 2000 volts per minute step by step.

Paste XII provided an insulation system having a dielectric strength greater than 285 volts per mil of insulation thickness. Similar results are obtained when Pastes XIII to XVIII inclusive are substituted for Paste XII. Similar results are also obtained when a silica-filled 20 mil thick silicone rubber tape having an average of at least 12 random depressions of from 1 to 10 mils deep per inch of tape width caused by sanding the tape surfaces, is substituted for the ribbed tape above.

That which is claimed is:

1. An insulated electric conductor comprising a conductor, a cured tack-free silicone rubber tape at least one surface of which is rough, said rough surface facing the conductor, said tape being tension wrapped with lapping around the conductor, the interstices between the laps of tape and between the tape and the conductor being filled with a cured diorganopolysiloxane containing a metallic oxide filler, whereby the dielectric strength of the resulting void-free insulation is at least 225 volts per mil of insulation thickness.

2. An insulated electric conductor of claim 1 further characterized in that the cured diorganopolysiloxane contains per silicon atom an average of from 1.98 to 2.01 silicon-bonded substituents selected from the group consisting of monovalent hydrocarbon radicals, halogenoaromatic monovalent hydrocarbon radicals and fluoroaliphatic monovalent hydrocarbon radicals in which each fluorine atom is separated from any silicon atom by at least three carbon atoms, and the metallic oxide filler consists of oxides of metals ranging from aluminum to bismuth in the periodic table of elements except potassium, calcium, rubidium, strontium, cesium and barium.

3. An insulated electric conductor of claim 1 further characterized in that the cured diogranopolysiloxane contains per silicon atom an average of from 1.98 to 2.01 silicon-bonded monovalent hydrocarbon radicals, and the metallic oxide filler consists of a metal oxide selected from the group consisting of titanium dioxide, zinc oxide and iron oxide.

4. An insulated electric conductor of claim 1 further characterized in that the cured diorganopolysiloxane contain per silicon atom an average of from 1.98 to 2.01 silicon-bonded monovalent hydrocarbon radicals of which from about 0.1 to about 1.0 percent of the silicon atoms in the diorganopolysiloxane have at least one vinyl group attached thereto, and the metallic oxide filler consists of oxides of metals ranging from aluminum to bismuth in the periodic table of elements except potassium, calcium, rubidium, strontium, cesium and barium.

5. An insulated electric conductor of claim 1 further characterized in that the cured diorganopolysiloxane contains per silicon atom an average of from 1.98 to 2.01 silicon-bonded monovalent hydrocarbon radicals of which from about 0.1 to about 1.0 percent of the silicon atoms in the diorganopolysiloxane have at least one vinyl group attached thereto, the metallic oxide filler consists of metal oxides selected from the group consisting of titanium dioxide, zinc oxide and iron oxide, and said dielectric strength of the resulting void-free insulation is at least 285 volts per mil of insulation thickness.

6. The insulated conductor of claim 1 further characterized in that the conductor is a coil for an electric machine.

7. An insulated electric conductor comprising a conductor, a cured tack-free silicone rubber tape at least one surface of which is rough, said rough surface facing the conductor, said tape being tension wrapped with lapping around the conductor, the interstices between the laps of tape and between the tape and conductor being filled with a cured paste composition which consisted essentially of a diorganopolysiloxane having a viscosity at 25° C. of from about 10,000 cs. to about 10,000,000 cs. and about 0.1 to about 1.0 percent of the siloxane units in said diorganopolysiloxane having at least one vinyl radical attached thereto, whereby the dielectric strength of the resulting void-free insulation is at least 225 volts per mil of insulation thickness.

8. An insulated electric conductor of claim 7 further characterized in that the cured paste composition consisted essentially of a diorganopolysiloxane having a viscosity at 25° C. of from about 10,000 cs. to about 10,000,000 cs. and containing per silicon atom an average of from 1.98 to 2.01 silicon-bonded substituents selected from the group consisting of monovalent hydrocarbon radicals, halogenoaromatic monovalent hydrocarbon radicals and fluoroaliphatic monovalent hydrocarbon radicals in which each fluorine atom is separated from any silicon atom by at least three carbon atoms, about 0.1 to about 1.0 percent of the siloxane units in said diorganopolysiloxane having at least one vinyl radical attached thereto.

9. The insulated conductor of claim 7 further characterized in that the conductor is a coil for an electric machine.

10. The insulated conductor of claim 8 further characterized in that the conductor is a coil for an electric machine.

No references cited.